No. 12,412. REISSUED NOV. 21, 1905.

F. X. WAGNER.

PAPER GUIDE FOR TYPE WRITING MACHINES.

APPLICATION FILED MAR. 27, 1905.

2 SHEETS—SHEET 1.

WITNESSES:

William Hilliert

Albert Nathan

INVENTOR

Franz X Wagner.

BY

P. B. Stickney

ATTORNEY.

No. 12,412. REISSUED NOV. 21, 1905.

F. X. WAGNER.

PAPER GUIDE FOR TYPE WRITING MACHINES.

APPLICATION FILED MAR. 27, 1905.

2 SHEETS—SHEET 2.

WITNESSES

William Hilbert

Alberta Nathan

INVENTOR

Franz X. Wagner

BY

A. B. Stickney

ATTORNEY

UNITED STATES PATENT OFFICE.

FRANZ X. WAGNER, OF NEW YORK, N. Y., ASSIGNOR TO UNDERWOOD TYPEWRITER COMPANY, OF NEW YORK, N. Y., A CORPORATION OF NEW JERSEY.

PAPER-GUIDE FOR TYPE-WRITING MACHINES.

No. 12,412. Specification of Reissued Letters Patent. Reissued Nov. 21, 1905.

Original No. 752,131, dated February 16, 1904. Application for reissue filed March 27, 1905. Serial No. 252,440.

*To all whom it may concern:*

Be it known that I, FRANZ X. WAGNER, a citizen of the United States, and a resident of the borough of Bronx, city, county, and State of New York, have invented certain new and useful Improvements in Paper-Guides for Type-Writing Machines, of which the following is a specification.

My invention relates to paper-guides for type-writing machines, and has for its object to provide simple means for efficiently guiding the paper and holding it in contact with the platen and also for enabling the paper to be fully released when desired.

To this end my invention consists in certain novel constructions and arrangements of parts, as will be fully described hereinafter, and particularly pointed out in the claims.

Reference is to be had to the accompanying drawings, in which—

Figure 1:
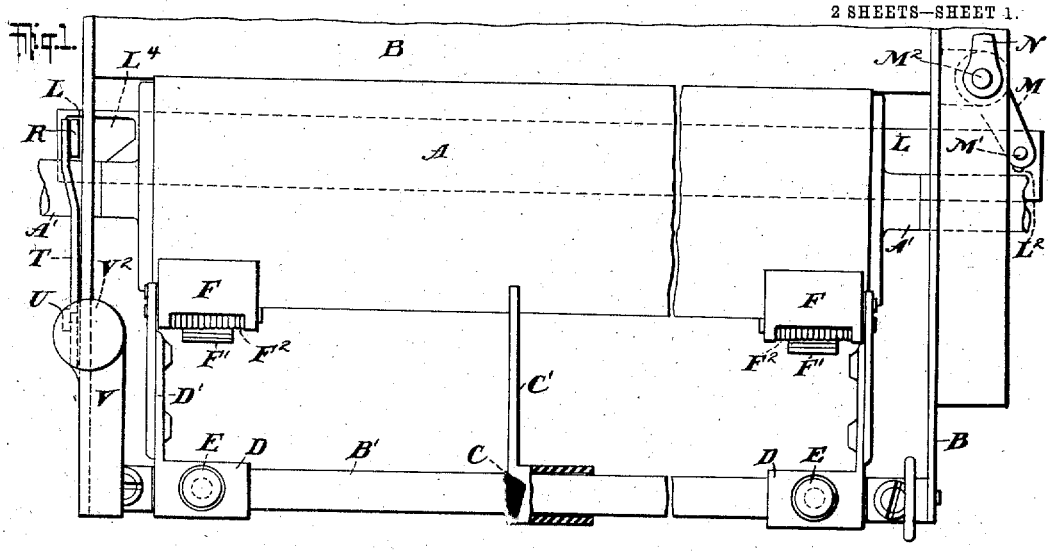
Figure 2:
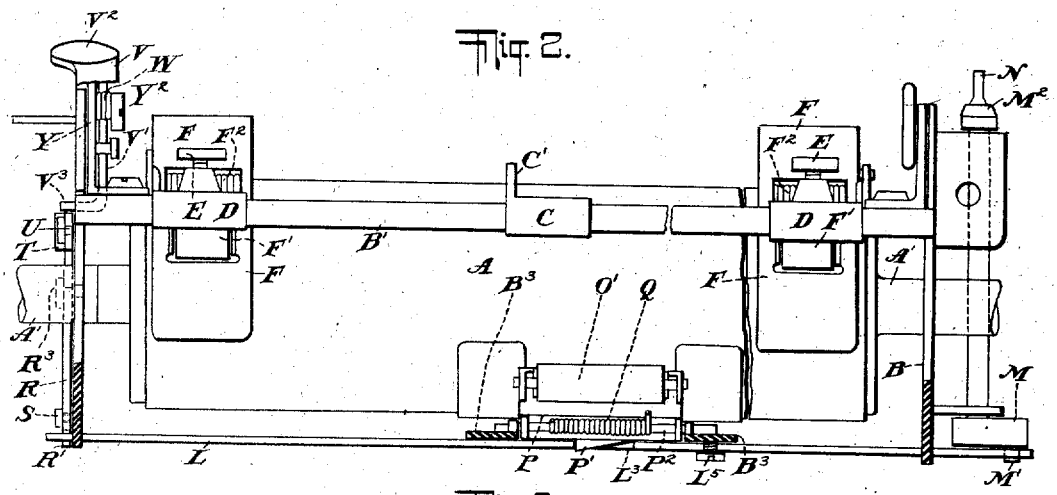
Figure 3:
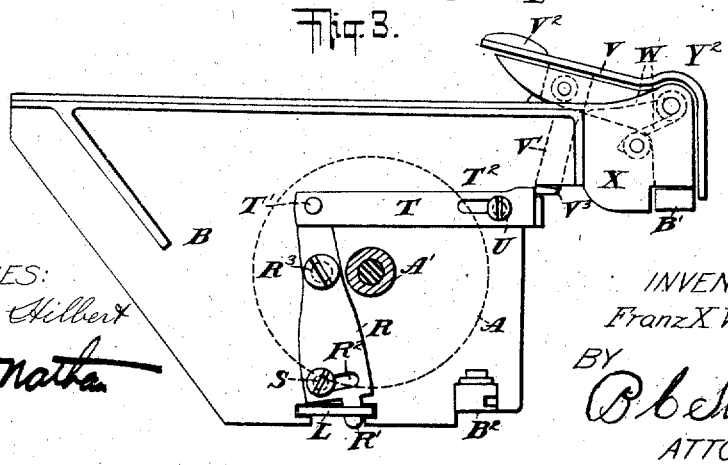
Figures 4, 5, 6, 7:
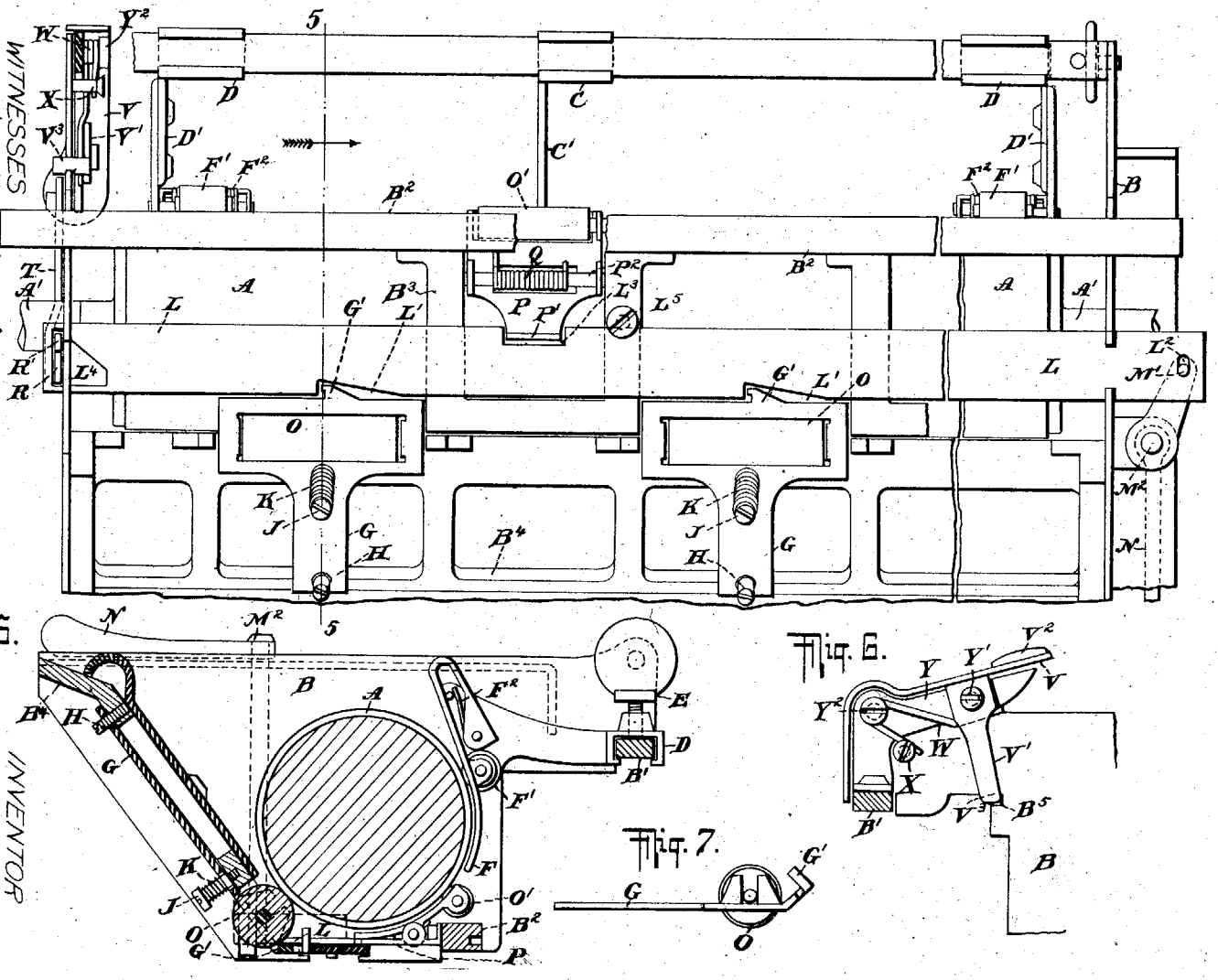

Figure 1 is a plan of the type-writer platen provided with my improvements. Fig. 2 is a front elevation thereof. Fig. 3 is an end elevation. Fig. 4 is an inverted plan. Fig. 5 is a sectional elevation on line 5 5 of Fig. 4. Fig. 6 is a detail showing the device for throwing the front rail of the platen and the devices carried thereby away from the platen, and Fig. 7 is a detail showing one of the feed-rollers arranged at the rear of the platen and the support of such roller.

A indicates the platen, and A′ its shaft, which is journaled in the platen-frame B. At its front portion the platen-frame has a front bar B′, movably supported, as will be described hereinafter. On this bar is adapted to slide a sleeve C, having a finger C′ arranged to engage the paper at the central portion of the platen. On the front bar B′ are further mounted adjustable sleeves D, having set-screws E and carrying brackets D′, which support curved paper-guides F. Each of these guides has a roller F′ journaled thereto, and the guide, together with the roller, is normally pressed against the platen by a spring $F^2$. (See Fig. 5.) Below the platen and at the rear thereof is located an open-work frame consisting of a front bar $B^2$, cross-bars $B^3$, and a rear bar $B^4$. This frame is rigidly connected with the platen-frame B. At the rear of the platen carriers G are loosely mounted, each carrier having at its upper end a loose engagement with a pin H, while near its lower end the carrier has a similar engagement with a screw J, surrounded by a coiled spring K, which has a tendency to throw the lower end of the carrier toward the platen. Below the platen is located a longitudinally-movable bar L, having cut-out portions or cam portions L′, which are adapted to engage projections G′ on the carriers G. A longitudinal movement of the bar L toward the left in Fig. 4 will therefore operate to throw the carriers G away from the platen. These carriers are provided with feed-rollers O, adapted to engage the platen. The looseness at the pins H and screws J is such that the rollers O can swing not only toward and from the platen, but also at an angle thereto, so that these rollers may accommodate themselves to any unevenness in the platen. The bar L is suitably guided in the frame B, and screws $L^5$ may be provided at suitable points to act as additional guides, it being understood that such screws would be alternately at opposite sides of the bar L. As a means of shifting the bar L, I may provide a crank M, having a pin M′, adapted to engage a slot $L^2$ of the bar L, while the shaft $M^2$ carries a handle N, through the medium of which the operator may shift the bar L lengthwise.

At the front portion of the platen and under the same carriers P are pivoted to the platen-frame, as indicated at $P^2$ in Fig. 4, and each of these carriers is provided with a cam projection P′, adapted to be engaged by a corresponding portion $L^3$ of the sliding bar L. Each of the carriers P is provided with a roller O′ and is normally pressed against the platen by a spring Q.

It will be understood that when the bar L is in the position illustrated by Fig. 4 all the rollers will be in engagement with the platen. If, however, the bar is shifted to the left, the cam portions or actuating portions L′ $L^3$ will engage the projections G′ P′ and swing the rollers O O′ away from the platen, thus releasing the paper. It is desirable that at the same time the guides F and the rollers F′ should be swung away from the platen. This is effected by the following mechanism: At one end the bar L is provided with a cut-out portion $L^4$, having an inclined wall. This inclined wall is adapted to engage a finger R′, projected from a lever R, which is pivoted at $R^3$ and guided by the engagement of a screw S with the walls of the slot $R^2$. When the bar L is moved from the position shown in Fig. 4, the lower end of the lever R is swung to the left, (referring to Fig. 3,) and its upper end is therefore moved to the right. This upper end is pivotally connected at T′ with a link T, provided with a slot $T^2$, engaging a stationary guide U. This link also engages a toe $V^3$ at the lower end of an arm V′, which projects from a lever V, fulcrumed at Y′ upon another lever Y, which in turn is fulcrumed at $Y^2$ upon the platen-frame. This lever Y also forms a carrier for the movable front bar B′ and is normally held in the positions illustrated by Figs. 3 and 6 by a spring W, which engages a stationary abutment X on the frame. A knob $V^2$ is provided on the lever V to facilitate operating same. The toe $V^3$ normally projects into a notch $B^5$ of the platen-frame. When the knob $V^2$ is pressed downward, the lever V will first rock alone on its pivot Y′, so as to disengage the toe $V^3$ from the notch $B^5$. Then as soon as the rear end of the lever V, below the knob $V^2$, engages the lever Y the two levers will move together, swinging about the pivot $Y^2$ and causing the front bar B′ and the paper-guides C′ F F′, carried thereby, to move away from the platen. The other rollers O O′ will, however, remain in engagement with the platen or the paper. The arrangement described therefore provides means for swinging the paper-guides F F′ away from the platen without affecting the adjustment of the other parts. When the operator by moving the handle N shifts the bar L and throws the rollers O O′ off the platen, as described, he also, through the medium of the lever R and link T, moves the lever V, as will be understood by reference to Fig. 3, and causes the front bar B′, with the parts carried thereby, to be swung in the same manner as they would be by the manual depression of the knob $V^2$. Any unevenness or roughness in the surface of the platen which would be encountered by the roller O would cause it to move in a direction radially away from the platen. Should such unevenness in the surface of the platen come in contact with the roller near one of its ends, the roller as an entirety would perform an indefinite oscillatory or skewing motion away from the platen, the roller then having a skewed relation to the platen, one end of the roller being nearer to the platen-axis than the other end thereof. Should the unevenness strike the roller near its middle, there would simply be a bodily movement of the roller radially away from the platen. The entire motion is accommodated by the play about the members J H.

I desire it to be understood that the particular form of construction shown in the drawings is only one example of my invention and that various modifications may be made without departing from the nature of my invention.

What I claim as new, and desire to secure by Letters Patent, is—

1. The combination, with the platen and pressure-exerting devices adapted to engage the same, of a longitudinally-movable bar for throwing the said pressure-exerting devices off the platen, a lever arranged to be swung transversely by the longitudinal movement of the said bar, and a paper-guide arranged adjacent to the platen and adapted to be swung away therefrom when the said lever is operated by the movement of the said bar.

2. The combination, with the platen and pressure-exerting devices adapted to engage the same, of means for throwing said pressure-exerting devices off the platen, a paper-guide movable toward and from the platen, and means for operating said paper-guide, said means being in loose engagement with the means for throwing the pressure-exerting device off the platen, so that the paper-guide may be operated independently of the said pressure-exerting devices.

3. The combination, with the platen, of a lever fulcrumed thereon, a paper-guide carried by said lever, and another lever fulcrumed upon the first-named lever and in locking engagement with the platen-frame, said second lever being capable of an initial independent movement to disengage it from the platen-frame.

4. The combination, with the platen and its frame, of a lever fulcrumed on said frame, a front bar carried by said lever, a paper-guide supported by said front bar, and an auxiliary locking-lever fulcrumed upon the first-named lever and normally in locking engagement with the platen-frame.

5. The combination with the platen and its frame, of a plurality of roller-carriers arranged adjacent to the platen and having their rollers running directly upon the platen and in longitudinal alinement with each other, means being provided for rendering each roller-carrier capable independently of the other of movement from said platen and for rendering said carriers capable of skewing motion away from the platen independently of one another, and means for throwing all of said carriers away from the platen.

6. The combination with the platen and its frame, of a plurality of carriers loosely mounted on said frame, means being provided for rendering said carriers movable independently of one another away from the platen, a plurality of alining rollers journaled on said carriers and extending parallel with the platen and running directly thereon, means being provided for rendering said carriers each capable of skewing motion away from the platen independently of one another, and means for throwing said carriers away from the platen.

7. The combination, with the platen and its frame, of pressure-exerting devices movable toward and from the platen, a sliding bar for throwing said pressure-exerting devices off the platen, said bar being provided with an inclined surface, a transversely-movable lever arranged to be operated by engagement with said inclined surface of the sliding bar, and a paper-guide movable toward and from the platen and arranged to be swung away from the platen by the movement of said lever.

8. The combination, with the platen and its frame, of a rigid carrier, a roller running directly upon the platen and having both of its ends journaled on said carrier, the carrier being pivotally and loosely supported so that the carrier and roller are capable of moving bodily away from the platen and of skewing motion from the platen, the axis of the roller being always in the same relation to the carrier during all of its motions, and means including a finger-piece for throwing said carrier and roller away from the platen.

9. In a type-writing machine, the combination with a platen, of a set of individual rolls extending end to end along the platen and running directly thereon, each roll pivotally and loosely supported so as to be capable of bodily motion away from the platen independently of the other rolls and also so that either of its ends may have independently of the other end and of the other rolls an indefinite oscillatory motion radially away from the platen.

10. In a type-writing machine, the combination with a platen, of a set of individual rolls all running directly upon the platen, means causing each roll to press against the platen independently of the others, each roll pivotally and loosely supported so as to be capable of bodily motion away from the platen independently of the other rolls and also so that either of its ends may have independently of the other end and of the other rolls an indefinite oscillatory motion radially away from the platen, and means for releasing said rolls simultaneously.

11. In a type-writing machine, the combination with a platen, of a set of individual rolls extending end to end and in a line along the platen and all running directly thereon, each roll pivotally and loosely supported so as to be capable of oscillatory motion away from the platen independently of the other rolls, springs for pressing the rolls individually against the platen, means being provided for causing the pressure of each spring to be borne by both ends of its roll, and means for releasing said rolls simultaneously.

12. In a type-writing machine, the combination with a platen, of a set of individual rolls extending along the platen and all running directly thereon, carriers for said rolls, each carrier pivotally and loosely supported so as to be capable of both bodily and skewing motion away from the platen independently of the other carriers, and springs pressing the carriers toward the platen.

13. In a type-writing machine, the combination with a platen, of a set of individual rolls extending along the platen and all running directly thereon, carriers for said rolls, each carrier pivotally and loosely supported so as to be capable of both bodily and skewing motion away from the platen independently of the other carriers, springs acting upon the carriers, a release handle or member, and means controlled by the latter for throwing the carriers and thereby releasing all of said rolls.

14. In a type-writing machine, the combination with a platen, of a set of individual rolls extending along the platen and all running directly thereon, carriers for said rolls, the carriers being loosely and pivotally supported in a plane extending between the ends of the rolls, in such a manner that they may independently of one another skew upon their bearings away from the platen and may also move bodily away from the platen, springs tending to keep both ends of the rolls against the platen, and means for throwing the carriers to release all of the rolls.

15. In a type-writing machine, the combination with a platen, of a set of individual rolls extending along the platen, carriers for said rolls, each carrier being pivotally and loosely supported so as to be capable of both skewing and bodily motion away from the platen independently of the other carriers, springs for the carriers, a handle or member, and a series of cams, one for each roll, controlled by said handle, to move said carriers away from the platen.

16. In a type-writing machine, the combination with a platen and a platen-frame, of means beneath the platen for guiding and feeding the paper forwardly and upwardly around the front side of the platen, a bar being mounted in front of the platen, brackets mounted upon said bar and extending back therefrom toward the platen, said brackets being adjustable independently of each other along said bar, pressure-rolls mounted upon the rear ends of said brackets and running upon the upper front side of the platen, and means for moving said bar to move said rolls from the platen.

17. In a type-writing machine, the combination with a platen and a platen-frame, of a pair of rolls mounted to press against the front of the platen, brackets upon whose rear ends said pressure-rolls are mounted, a bar in front of the platen upon which said brackets are mounted and along which the brackets are independently adjustable, and means for moving said bar to release said rolls from the platen.

18. In a type-writing machine, the combination with a platen and a platen-frame, of releasable pressure-rolls beneath the platen, a pair of rolls to press against the upper front side of the platen, a bar in front of the platen, means whereby said front rolls are mounted upon said bar so as to be adjustable there-along independently of each other, a handle or finger-piece, and means connected to the latter for releasing both of said front rolls simultaneously wherever they are adjusted along said bar and independently of the rolls beneath the platen.

19. In a type-writing machine, the combination with a platen and a platen-frame, of a bar mounted in front of the platen, brackets mounted upon said bar and extending back therefrom toward the platen, said brackets being adjustable independently of each other along said bar, a pair of rolls mounted upon the rear ends of said brackets to press against the upper front side of the platen, pressure-rolls beneath the platen and mounted independently of said bar, a manually-operable device or handle, and means for enabling the latter to release all of said rolls simultaneously.

20. In a type-writing machine, the combination with a platen and a platen-frame, of a pair of rolls to press against the front of the platen, a bar in front of the platen along which said rolls are independently adjustable, pressure-rolls beneath the platen, means for releasing all of said rolls simultaneously, and means, including a finger-piece or knob, for releasing said front rolls, independently of the rolls beneath the platen.

21. In a type-writing machine, the combination with a platen and a platen-frame, of a pair of rolls to press against the front of the platen, a movable bar mounted upon the platen-frame in front of the platen, a pair of brackets adjustable independently of each other along said bar, said rolls mounted on the rear ends of said brackets, pressure-rolls beneath the platen, means for releasing all of said rolls simultaneously, and a finger-piece connected to said bar for moving the same to release said front rolls independently of the rolls beneath the platen.

22. In a type-writing machine, the combination with a platen, of a set of individual rolls extending along the platen beneath the same, each roll mounted so as to be capable of oscillatory motion away from the platen independently of the other rolls, springs for pressing the rolls individually against the platen, a pair of rolls mounted to bear against the front of the platen and adjustable along the latter independently of each other, manually-controlled means for releasing all of said rolls simultaneously, and means for releasing said front rolls independently of the rolls beneath the platen.

23. In a type-writing machine, the combination with a platen, of a set of pressure-rolls beneath the platen, a set of rolls mounted to bear against the front of the platen and adjustable independently of each other along the platen, means controlled by a single manually-operable device for releasing both sets of rolls simultaneously, and means for releasing one set of rolls independently of the other set thereof.

24. In a type-writing machine, the combination with a platen, of a set of individual rolls extending along the platen beneath the same, each roll mounted so as to be capable of oscillatory motion away from the platen independently of the other rolls, a set of rolls mounted to bear against the front of the platen and adjustable along the latter independently of each other, and manually-controlled mechanism for releasing all of said rolls; said releasing mechanism including means for releasing one set of said rolls independently of the other set thereof.

25. In a type-writing machine, the combination with a platen, of a set of individual rolls extending end to end along the platen beneath the same and each mounted so as to be capable of oscillatory motion away from the platen independently of the other rolls, a manually-controlled releasing member common to said rolls, and a pressure-roll beneath the platen forward of said rolls and releasable by said releasing member.

26. In a type-writing machine, the combination with a platen, of a set of individual rolls extending end to end along the platen beneath the same, a carrier for each roll, each carrier pivotally and loosely supported so as to be capable of oscillation away from the platen and also so as to be capable of bodily movement away from the platen radially thereof, springs pressing said carriers toward the platen, a releasing member extending along the platen and having means for camming said carriers away from the platen, a pressure-roll forward of said rolls, and means for enabling said releasing member to cam said forward roll away from the platen.

27. In a type-writing machine, the combination with a platen and a platen-frame, of means for guiding and feeding paper forwardly beneath the platen and up in front of the same, a bar extending along the platen in front thereof, brackets extending between said bar and said platen and adjustable along the bar independently of each other, pressure-rolls mounted upon the rear ends of said brackets and bearing against the upper front side of the platen, said bar being movable in a direction to release said rolls from the platen, and a latch, V′, preventing accidental movement of said bar from normal position.

28. In a type-writing machine, the combination with a platen and a platen-frame, of a bar extending along the platen in front thereof, brackets extending between said bar and said platen and adjustable along the bar independently of each other, pressure-rolls mounted upon the rear ends of said brackets and bearing against the platen, said bar being movable in a direction to release said rolls from the platen, a latch preventing accidental movement of said bar from normal position, and a finger-piece or knob capable of both releasing said latch and moving said bar to release said rolls.

29. In a type-writing machine, the combination with a platen and a platen-frame, of means for guiding the paper forwardly beneath the platen and up around the under front side thereof, a bar mounted in front of the platen, a pair of brackets mounted upon said bar and directed rearwardly therefrom toward the platen, said brackets adjustable independently of each other along said bar, rolls mounted upon the rear ends of said brackets and bearing against the upper front side of the platen, and a manually-operable part or finger-piece; means being provided for enabling a movement of said finger-piece to release simultaneously said front rolls wherever they are adjusted along said bar.

FRANZ H. WAGNER.

Witnesses:

B. C. STICKNEY,

ALBERT F. NATHAN.